United States Patent
Taillon et al.

(10) Patent No.: US 9,160,652 B2
(45) Date of Patent: Oct. 13, 2015

(54) FAST REROUTE FOR BIDIRECTIONAL CO-ROUTED TRAFFIC ENGINEERING TUNNELS

(75) Inventors: Michel Taillon, Stittsville (CA); Tarek Saad, Nepean (CA); Rakesh Gandhi, Stittsville (CA); Zafar Ali, Hicksville, NY (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 13/600,834

(22) Filed: Aug. 31, 2012

(65) Prior Publication Data

US 2014/0064062 A1    Mar. 6, 2014

(51) Int. Cl.
*H04L 29/14* (2006.01)
*H04L 12/707* (2013.01)
(Continued)

(52) U.S. Cl.
CPC .............. *H04L 45/22* (2013.01); *H04L 45/28* (2013.01); *H04L 45/50* (2013.01)

(58) Field of Classification Search
CPC ....... H04L 45/475; H04L 45/00; H04L 43/00; H04L 47/10; H04L 47/11; H04L 47/125; H04L 12/2602; H04L 45/24; H04L 45/502; H04L 45/507; H04L 45/745; H04L 45/16; H04L 41/0668; H04L 41/0654; H04L 41/0686; H04L 45/026; H04L 45/04; H04L 41/0659; H04L 41/0631; H04L 43/0811; H04L 43/0823; H04L 41/0836; H04L 43/10; H04L 29/12575; H04L 45/28; H04L 45/22; H04L 12/4633; H04L 41/0816; H04L 47/746
USPC ......... 370/225, 400, 228, 216, 244, 242, 389, 370/401, 218, 221, 239; 709/232, 224
See application file for complete search history.

(56) References Cited

U.S. PATENT DOCUMENTS

| | | | |
|---|---|---|---|
| 6,778,492 B2 | 8/2004 | Charny et al. | |
| 7,457,233 B1 | 11/2008 | Gan et al. | |

(Continued)

FOREIGN PATENT DOCUMENTS

EP    2101452 A1    9/2009

OTHER PUBLICATIONS

International Search Report and Written Opinion from related International Application No. PCT/US2013/056754, Oct. 22, 2013, WO.

(Continued)

*Primary Examiner* — Charles C Jiang
*Assistant Examiner* — Rose Clark
(74) *Attorney, Agent, or Firm* — Lempia Summerfield Katz LLC

(57) ABSTRACT

In one embodiment, network devices are configured to route traffic and signaling onto co-routed bypass tunnels. Co-routed bypass tunnels protect against node or link failures in a label switched paths. The co-routed bypass tunnels provide bidirectional protection. In one example, a node acting as the point of local repair (PLR) receives a resource reservation state message at a first node and extracts a tunnel sender address from the reservation state message. The PLR is configured to identify a bypass tunnel to a second node in the reverse direction of the label switched path and signal resource reservation messages over the bypass tunnel in the reverse direction. In another example, a PLR receives a resource reservation message with bypass tunnel identification and the PLR is configured to identify a bypass tunnel to a second node in the reverse direction.

18 Claims, 7 Drawing Sheets

(51) Int. Cl.
*H04L 12/703* (2013.01)
*H04L 12/723* (2013.01)

(56) References Cited

U.S. PATENT DOCUMENTS

| | | | |
|---|---|---|---|
| 7,602,702 B1 * | 10/2009 | Aggarwal | 370/217 |
| 7,826,348 B2 | 11/2010 | Farinacci et al. | |
| 8,072,879 B2 | 12/2011 | Vasseur et al. | |
| 8,077,726 B1 * | 12/2011 | Kumar et al. | 370/395.31 |
| 2005/0007950 A1 | 1/2005 | Liu | |
| 2008/0062882 A1 | 3/2008 | Xiao et al. | |
| 2011/0038380 A1 * | 2/2011 | Li et al. | 370/401 |
| 2011/0063972 A1 * | 3/2011 | Muley et al. | 370/225 |
| 2011/0090786 A1 * | 4/2011 | Liu et al. | 370/221 |
| 2011/0205885 A1 * | 8/2011 | Kini et al. | 370/217 |
| 2013/0010589 A1 * | 1/2013 | Kini et al. | 370/219 |
| 2013/0250963 A1 * | 9/2013 | Zhao et al. | 370/400 |
| 2013/0259056 A1 * | 10/2013 | Kotrabasappa et al. | 370/401 |
| 2013/0301403 A1 * | 11/2013 | Esale et al. | 370/221 |
| 2013/0336191 A1 * | 12/2013 | Zhao et al. | 370/312 |
| 2013/0343174 A1 * | 12/2013 | Guichard et al. | 370/218 |
| 2014/0029416 A1 * | 1/2014 | Ceccarellli et al. | 370/225 |
| 2014/0029419 A1 * | 1/2014 | Jain et al. | 370/228 |

OTHER PUBLICATIONS

Pan et al., "Fast Reroute Extensions to RSVP-TE for LSP Tunnels" Avici Systems May 2005.

Braden, Ed., et al., "Resource ReSerVation Protocol (RSVP)—Version 1 Functional Specification", University of Michigan 1997, Sep. 1997.

"MPLS Traffic Engineering Fast Reroute—Link Protection", Release No. 12.0(10)ST, accessed Jun. 29, 2012.

International Preliminary Report on Patentability, from PCT/US2013/056754, Mar. 12, 2015, WO.

* cited by examiner

FAST REROUTE FOR BIDIRECTIONAL CO-ROUTED TRAFFIC ENGINEERING TUNNELS

TECHNICAL FIELD

This disclosure relates in general to the field of communication paths and, more particularly, to backup tunnel communication paths.

BACKGROUND

A label switched path (LSP) is a tunnel established using label switching techniques through a network of label switched routers. Occasionally, when a network element fails, traffic that originally traversed the failed network element to other network elements is diverted to another path to bypass the failure. Fast Reroute (FRR) has been widely deployed to protect against network element failures. Backup tunnels are created to bypass one or more protected network elements. When the network element fails, traffic is diverted over a backup tunnel to bypass the failed element. Specifically, the point of local repair (PLR) node is configured to reroute the traffic by inserting a new label for the backup tunnel, and the traffic is diverted accordingly. Once the failed element is bypassed, the backup tunnel label is removed, and the traffic is routed along the original path according to the next label. However, these procedures are applicable only to unidirectional tunnels.

BRIEF DESCRIPTION OF THE DRAWINGS

Exemplary embodiments of the present invention are described herein with reference to the following drawings.

DESCRIPTION OF EXAMPLE EMBODIMENTS

Overview

Figure 1:
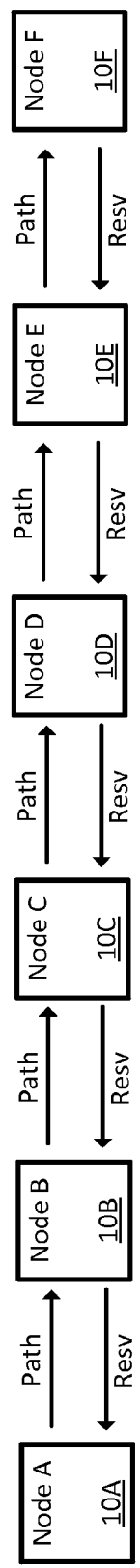
FIG. 1 illustrates an example series of network devices.

In one embodiment, a node receives a resource reservation state message in a forward direction of a label switched path and extracts a tunnel sender address from the resource reservation state message. Based on the tunnel sender address, the node identifies a bypass tunnel from a second node in a reverse direction of the label switched path, and signals resource reservation messages over the bypass tunnel in the reverse direction.

In another embodiment, a node identifies a link failure or a node failure between a first node and a second node of a label switched path and redirects traffic of the label switched path to a first bypass path in a forward direction. The node also receives traffic from the second node over a second bypass path in a reverse direction, and routes a resource reservation state message onto the first bypass path from the first node.

In another embodiment, a node receives a path message from a forward direction in a label switched path and detects a reservation protocol bypass object in the path message. The node is configured to compare a bypass destination address of the reservation protocol bypass object with an address of the node. The node either assigns a bypass tunnel in a reverse direction for the label switched path, when the bypass destination address is associated with the address of the node, or forwards the reservation protocol bypass object in the forward direction, when the bypass destination address is not associated with the address of the node.

EXAMPLE EMBODIMENTS

Procedures in request for comment (RFC) 4090, "Fast Reroute Extensions to RSVP-TE for LSP Tunnels" published May 2005, proscribe the use of bypass tunnels for local repair of primary tunnels. The node acting as the point of local repair (PLR) routes traffic and signaling onto a bypass tunnel in the event of a failure on a unidirectional tunnel. Traffic includes data flows or data packets. The failure may occur at a node or a link. A node is a communication point on a network such as a router, hub, bridge, or switch. A link is a communication path that connects two nodes. Fast reroute (FRR) provides fast traffic recovery upon a failure, such as providing reroute as fast as 50 ms. However, RFC 4090 is not effectively applied to bidirectional tunnels for two reasons.

First, asymmetric paths lead to failed rerouting. When using existing procedures with bidirectional LSPs, rerouting procedures are ineffective when a link failure event occurs in a node protecting a bypass tunnel. A bypass tunnel may include one or more nodes and links in a communication path from one node on the LSP to another node on the LSP. The bypass path may include one or more layer 2 and/or layer 3 devices. After the PLR completes rerouting traffic and signaling onto the bypass tunnel, some signaling refreshes may not reach some nodes along the LSP because the link failure is bypassed at different nodes in different directions. The signaling refreshes may be resource reservation protocol (RSVP) messages. When the refreshes do not reach a node, the RSVP soft-state timeout eventually causes the LSP to be destroyed, impacting traffic flow. The RSVP soft-state timeout may be 40 seconds or less.

Second, tunnel assignment coordination is not possible with existing procedures. When co-routed bidirectional bypass tunnels are used to locally protect bidirectional LSPs, the upstream and downstream PLRs may independently assign different bidirectional bypass tunnels in the forward and reverse direction. There is no coordination of the bypass tunnel selection between the downstream and upstream PLRs. In case of mismatch and after FRR, data traffic and signaling may flow over asymmetric paths in the forward and reverse direction.

The following embodiments provide corrective actions in the control plane that may maintain the RSVP soft-state for bidirectional LSPs protected by node-protection bypass tunnels, achieve symmetry in the paths followed by data and signaling in the forward and reverse directions post FRR, and extend RSVP signaling so that the bypass tunnel selected by the upstream PLR matches the one selected by the downstream PLR. The corrective actions described in the following embodiments apply to link failures, node failures, or a combination of both.

FIG. 1 illustrates a series of network devices 10A-F, which form a label switched path (LSP) configured to handle traffic according to forwarding equivalence classes. The traffic may be a set of packets with similar or the same characteristics, which should be forwarded in the same manner. Examples include audio and video streams. The network devices 10A-F may be any arrangement of routers, gateways, hubs, switches, and/or other devices configured for communication on data networks. The network device 10A, which may be referred to as Node A, is a head end of the LSP shown in FIG. 1. The network device 10F, or Node F, is a tail end of the LSP. FIG. 1 illustrates a state of the LSP including no bypass tunnels. Networks or LSPs with additional, different, or fewer nodes and/or links may be used.

Figure 2:
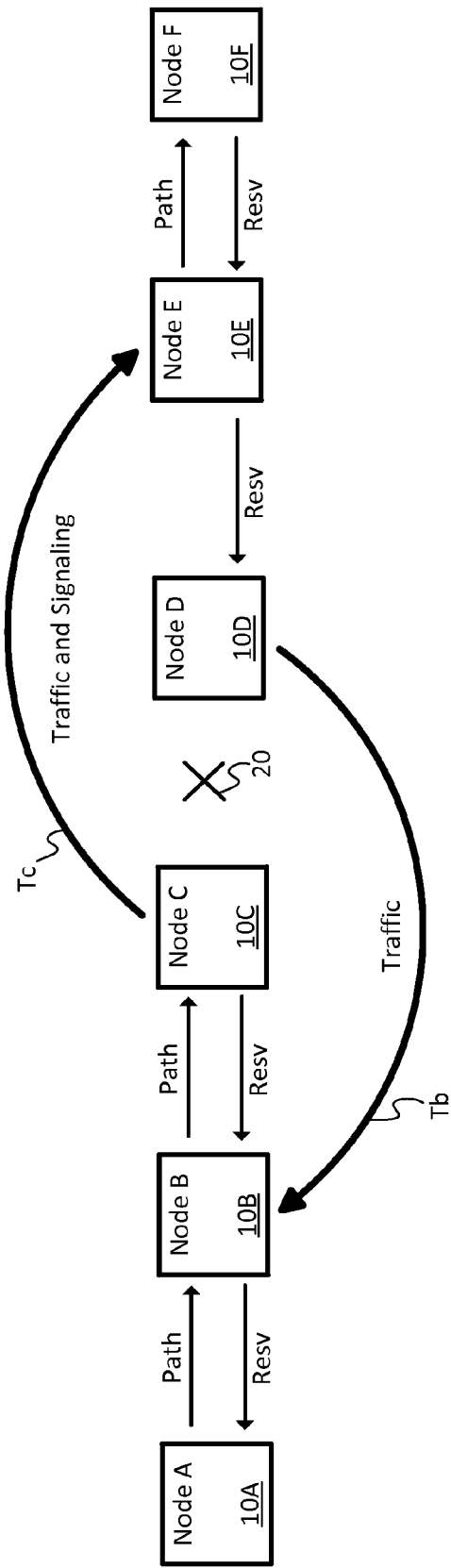
FIG. 2 illustrates the network devices of FIG. 1 including a phase of repair for a failed link.

FIG. 2 illustrates the network of FIG. 1 including a failed link 20 between node C and node D. Other links or nodes may fail as an alternative or in addition. Each of the links between network devices 10A-F may be protected with a node-protection bypass tunnel. For example, each of the network devices 10B-E traversed in the path from Node A to Node F may independently assign a node protection bypass tunnel. The node protection bypass is assigned by any nodes local to the fault.

A point of local repair (PLR) is a network device that locally detects a fault and reroutes traffic. Downstream PLRs reroute traffic in the forward direction. Upstream PLRs reroute traffic in the reverse direction. The forward direction may be the direction of RSVP PATH message signaling of the protected bidirectional label switch path. The reverse direction is opposite the direction of RSVP PATH message signaling of the protected bidirectional label switch path. In the example of FIG. 2, Node C is a downstream PLR that reroutes traffic along bypass tunnel Tc. Node D is an upstream PLR that reroutes traffic along bypass tunnel Tb. Node C and Node D are configured to identify a link failure between Node C and Node D. The bypass tunnels Tb and Tc are set up to protect or bypass a failure in link 20.

Node D is an upstream PLR. For the local repair, Node D reroutes data traffic over the bypass tunnel Tb, which is a node protection tunnel. Node D identifies the upstream merge point. Node D uses the identity of the upstream merge point to determine that data in the reverse direction is to be forwarded to the bypass tunnel Tb.

The upstream merge point may be identified from a label included in a record route object (RRO) of a RSVP path message received at Node D. Node D is configured to obtain the upstream merge point label from the recorded label in the RRO of the received RSVP path message. Similarly, in unidirectional primary LSPs, the downstream merge point label is obtained from the RRO of the RSVP Resv message received at the downstream PLR, such as Node C.

As shown in FIG. 2, Node C and Node D independently trigger rerouting procedures to redirect traffic onto respective bypass tunnels Tc and Tb in the forward and reverse direction. Node C, which is acting as a PLR, reroutes RSVP path state messages in the forward direction to bypass tunnel Tc using procedures describes in the request for comment (RFC) 4090, "Fast Reroute Extensions to RSVP-TE for LSP Tunnels" published May 2005. For example, Node C sends at least one primary LSP path message over the bypass tunnel Tc. Node C removes intermediate node and/or link addresses between Node C and a merge-point listed in the ERO (Explicit Route Object) of the primary LSP before sending the path message over the backup tunnel. This procedure may be referred to as ERO substitution.

Node C may also be configured to substitute or modify the sender IP address in the path message. The modified sender IP address identifies Node C as a sender of the path message for the primary LSP. The previous sender IP address identified the head node (e.g., Node A) of the primary LSP as the source address. In addition, the IPv4 (or IPv6) tunnel sender address of the SENDER_TEMPLATE is set to an address belonging to the PLR (Node C). The merge point (e.g., Node E) is configured to generate and send one or more messages to Node C with a destination IP address of Node C retrieved from a RSVP_HOP object.

As a result, Node D no longer receives RSVP path refreshes for the protected bidirectional LSP because Node D has been bypassed by the bypass tunnel Tc. Local repairs over Bypass tunnels Tc and Tb are completed and primary traffic is protected by routing traffic over the bypass tunnels. The bidirectional bypass paths are not symmetric.

Figure 3:
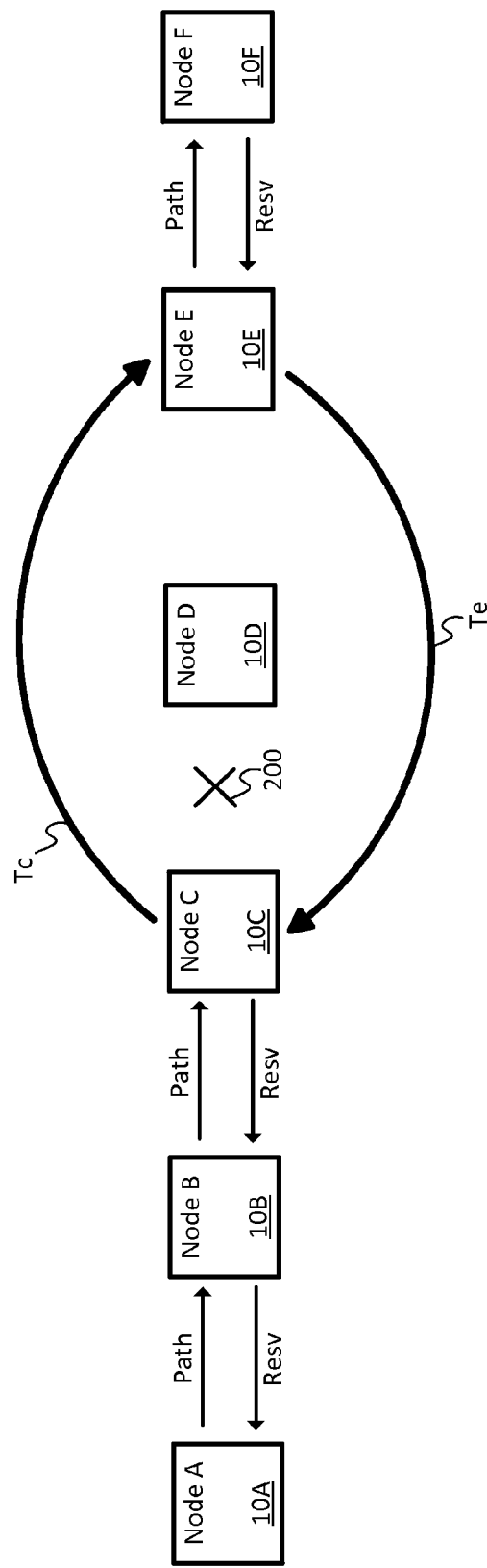
FIG. 3 illustrates the network of FIGS. 1 and 2 in another phase of fast reroute repair.

FIG. 3 illustrates the network of FIGS. 1 and 2 in another phase of fast reroute repair for a bidirectional LSP, but with symmetry in the bypass paths. The symmetry is formed by adjusting the reverse path bypass Tb. In alternative embodiments, the symmetry is formed by adjusting the forward path bypass Tc.

A point of remote repair (PRR) is used to adjust the bypass Tb. A PRR is a network device that is configured to trigger the reroute of traffic and signaling. Node E is a PRR and a downstream merge point. Node E received the rerouted RSVP path message through the bypass tunnel Tc from Node C.

Node E is configured to receive at least one resource reservation state message. For example, Node E is configured to check for the presence of a bypass tunnel in the reverse direction from Node E to Node C. In one example, Node E first identifies Node C by locating and extracting a SENDER_TEMPLATE object in a resource reservation state message packet. The SENDER_TEMPLATE object includes a tunnel sender address field.

Node E is configured to identify, based on the tunnel sender address field, a bypass tunnel in the reverse direction. If the tunnel sender address field in the resource reservation state message packet includes the address of Node C, then the packet was sent by Node C, and the bypass tunnel Tc from Node C to Node E is present and being used. Node E determines whether a bypass tunnel in the reverse direction (e.g., bypass tunnel Te) that terminates in Node C exists by checking the destination address of the locally provisioned or automatically created backup tunnels.

Based on whether or not the bypass tunnel Te is present, Node E is configured to monitor the traffic over the bypass tunnel Te. If the bypass tunnel Te is present, Node E checks whether the primary LSP traffic and signaling is already rerouted over the bypass tunnel Te. Node E is configured to check the received RSVP Path messages for the primary LSPs using sender address and PREV_HOP address to determine if RSVP path messages are arriving on the bypass tunnel. Node E is configured to check the presence of the backup tunnel label and merge point label stack to detect if traffic is arriving over the bypass tunnel on the merge point node. If the traffic and signaling is not already rerouted over the bypass tunnel Te, Node E is configured to activate the FRR reroute procedures to direct traffic and signaling over the bypass tunnel Te in the reverse direction.

If the bypass tunnel Te is not present, Node E initiates the generation of bypass tunnel Te. For example, Node E is configured to auto-provision a bypass tunnel from Node E to Node C. In order to auto-provision the bypass tunnel, Node E is configured to automatically create a bypass tunnel and signal an LSP to destination node as Node C bypassing or avoiding the link and node it is protecting (and that may have failed). Node E derives the information about the link and node that the bypass tunnel should be protecting by examining the path of the primary LSP.

In one example, the reverse bypass tunnel Te is inferred from the forward bypass tunnel Tc. The inference involves reflecting the RRO recorded in the forward direction as the explicit route object (ERO) for the reverse direction. The ERO is carried in RSVP messages as the mechanism for distributing the explicit route information to nodes along the path. Because the bypass tunnel Te is created from Node in the reverse direction, traffic does not reach Node D, and Node D does not provision bypass Tb.

Node E may also be configured to determine whether the bypass tunnel Te was successfully provisioned. If the bypass tunnel Te was successfully provisioned, Node E may generate a status message including the path of the bypass tunnel Te. If the bypass tunnel Te was not successfully provisioned, Node E may be configured to generate an RSVP notify message that includes data indicative of an unsuccessful provisioning. Node E may transmit the RSVP notify message to the head-end of the LSP (e.g., Node A). In response, Node A may be configured to tear down and re-setup the LSP.

When Node A receives data of a failure or instructions to co-route primary LSP over co-routed bypass LSP, Node A may immediately reoptimize the LSP by excluding the failed link or node and placing the LSP on a new co-routed path. If no such path is found or reoptimization attempt fails, node A may tear down the primary LSP by sending an RSVP path tear down message. Node A may also stop sending traffic over the primary tunnel. Subsequently, head node A may bring up the co-routed primary LSP on a new path when the new path is available.

In some circumstances, more than one failure may occur on the LSP. If multiple failures occur, multiple bypass tunnels may be generated by the various nodes. If Node E receives multiple RSVP Path messages through multiple bypass tunnels, then Node E (or another PRR) is configured to calculate a distance to each of the PLR nodes to Node E. The distances may be measured in the number of hopes. Node E compares the distances to identify the farthest distance. The farthest distance indicates the bypass tunnel that terminates on the farthest downstream PLR.

Node E is configured to provision a bypass tunnel that terminates on the farthest downstream PLR along the protected LSP path. For example, Node E may receive multiple RSVP Path messages, extract a SENDER_TEMPLATE object in each of the RSVP path messages, and identify data in the tunnel sender address fields of the RSVP path messages. The sender addresses are compared to determine which bypass path originates at a node closest to the head end of the LSP. Node E may use local traffic engineering (TE) topology database and record route object from the RSVP path message of the primary LSP to identify the node closest to the head end. Using the procedures above, a bypass path in the reverse direction is identified and/or initiated by Node E to terminate at the node closest to the head end.

In one embodiment, the selection of bypass tunnels are coordinated such that the bypass tunnel selected at the downstream and upstream PLRs are symmetric and rerouted traffic and signaling flows on symmetrical paths after the FRR procedure.

Figure 4:
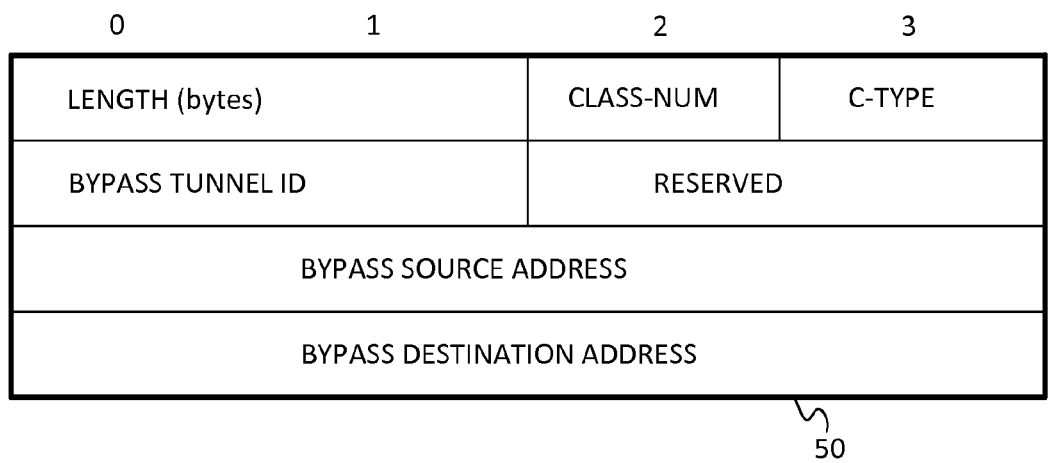
FIG. 4 illustrates an example reservation protocol object.

FIG. 4 illustrates an example reservation protocol bypass object 50. Each downstream PLR (e.g., Node C) is configured to define an RSVP object that identifies a bidirectional bypass tunnel assigned at the downstream PLR to protect the bidirectional LSP. The RSVP object may be identified as <DOWNSTREAM_BYPASS_ASSIGNMENT> and include data indicative of (1) the bypass tunnel identification value, (2) the bypass source address, and (3) the bypass destination address. Additional, different, or less information may be provided in the same or different format as shown in FIG. 4.

Figure 5:
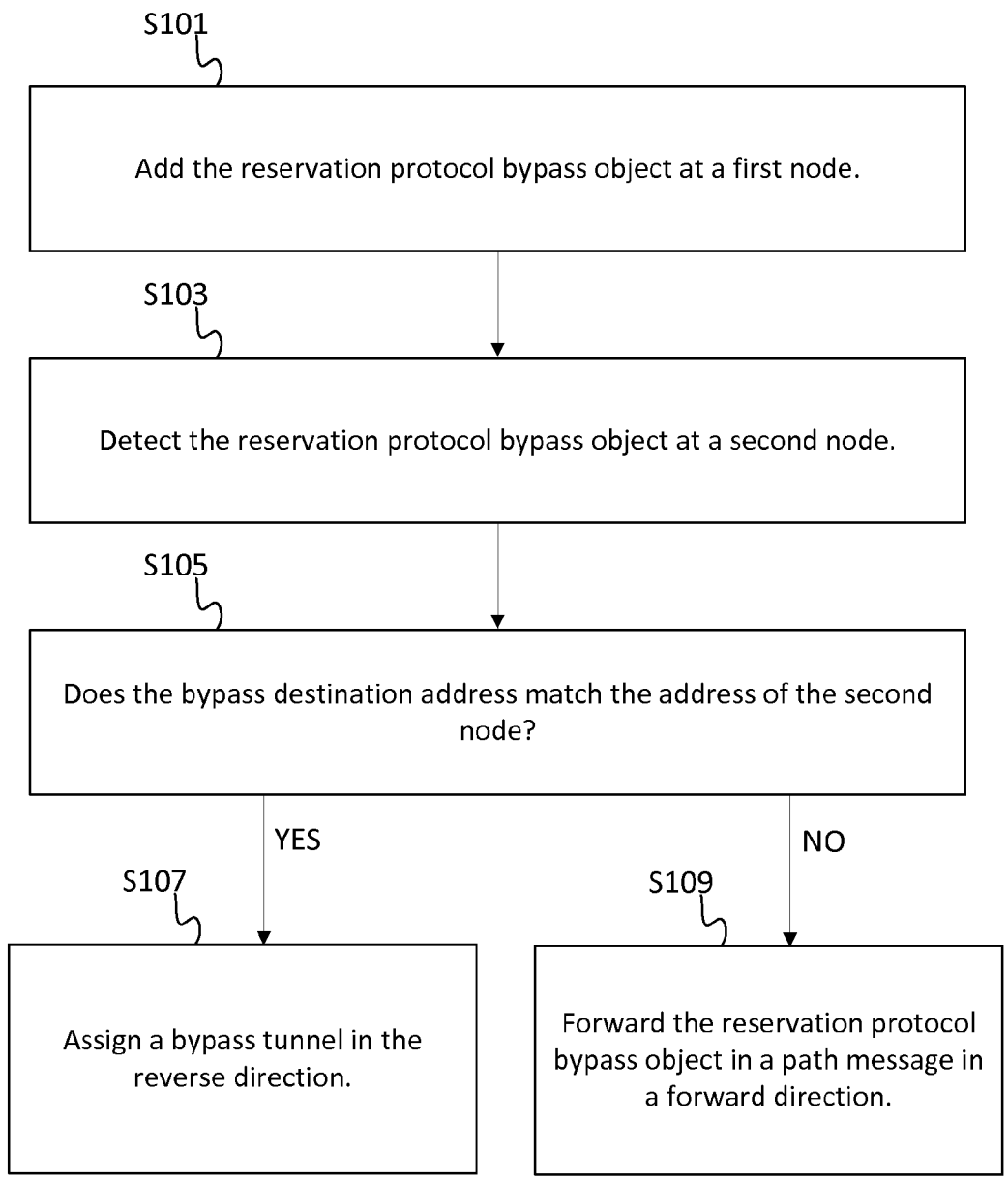
FIG. 5 illustrates an example flowchart for operation of the reservation protocol object.

FIG. 5 illustrates an example flowchart for operation of the reservation protocol bypass object. At act S101, a downstream PLR adds the reservation protocol bypass object (DOWNSTREAM_BYPASS_ASSIGNMENT) in the RSVP Path message of the primary LSP to record the downstream bidirectional bypass tunnel assignment. Each downstream PLR may add the reservation protocol bypass object to the RSVP Path message. This reservation protocol bypass object is sent in the RSVP Path message every time the downstream PLR assigns or updates the bypass tunnel assignment so the upstream PLR may reflect the assignment.

At act S103, an upstream node detects the presence of the reservation protocol bypass object. The upstream node may be any upstream PLR (e.g., Node D), which is configured to detect and identify a reservation protocol bypass object.

At act S105, the upstream node is configured to extract the data indicative of the bypass destination address and compare the bypass destination address to the address of the upstream PLR to determine whether the bypass destination address matches the address of the upstream node.

At act S107, if the bypass tunnel destination address matches the address of the upstream node, the upstream node assigns the matching bidirectional bypass tunnel in the reverse direction, and removes the corresponding bypass tunnel assignment object from the RSVP Path message before forwarding the RSVP Path message downstream.

At act S109, if the upstream PLR does not identify a match between the bypass destination address and the address of the upstream node, the bypass tunnel assignment object is forwarded downstream in the RSVP Path message.

If the upstream PLR is unable to identify a reservation protocol bypass object (DOWNSTREAM_BYPASS_ASSIGNMENT) (e.g., the bypass tunnel assignment object is absent), the upstream PLR is configured to independently assign a bypass tunnel in the reverse direction.

In one example, the upstream PLR may receive multiple reservation protocol bypass objects from multiple downstream PLRs. The upstream PLR may store data indicative of a local policy to define a procedure to process multiple received objects. For example, the local policy may specify a preference for link protection rather than node protection, a preference for node protection rather than link protection, a preference to defer to the most upstream protection bypass tunnel, a preference to defer to the least upstream protection bypass tunnel, or another preference or combination of preferences. One of the received objects is selected based on the policy.

Figure 6:
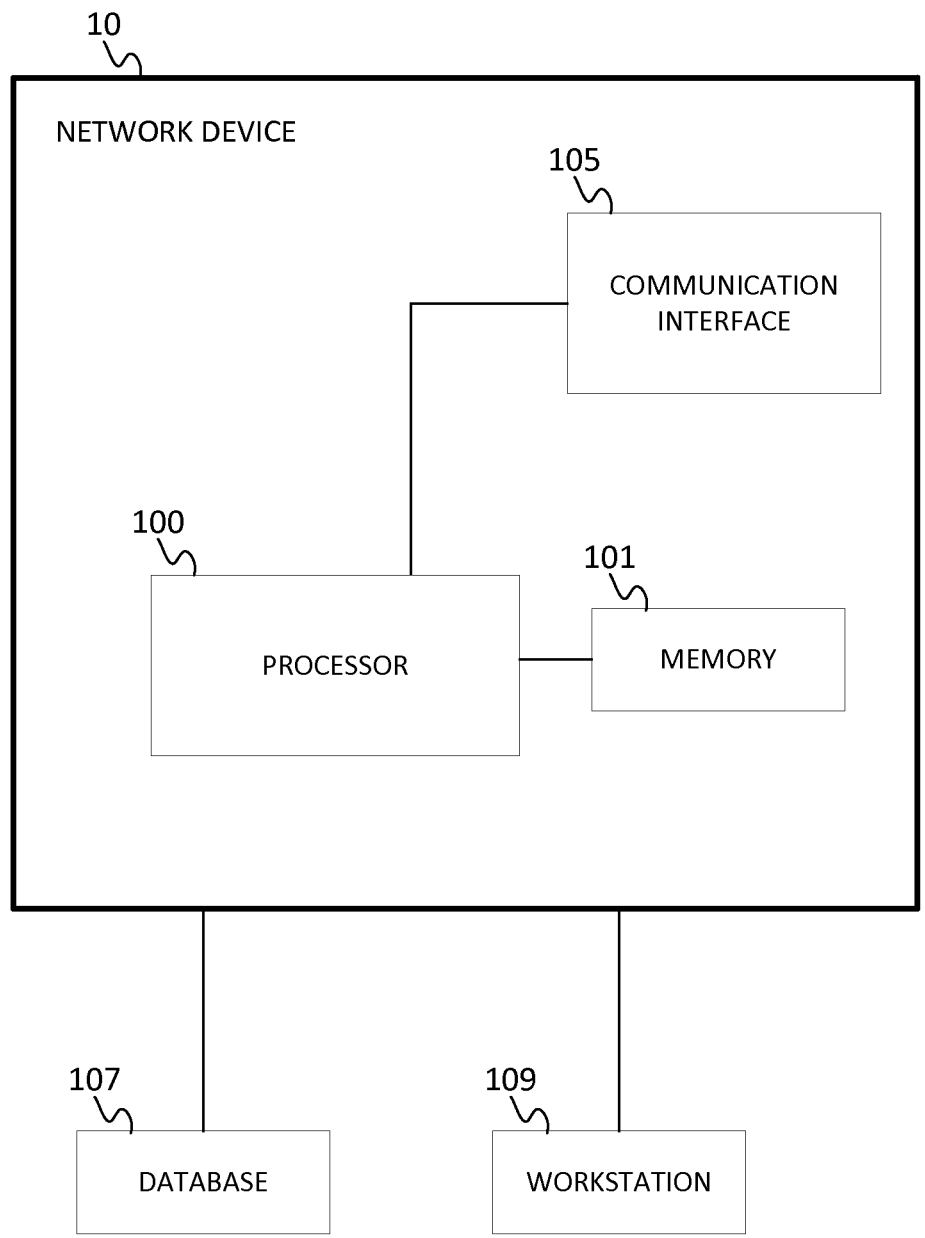
FIG. 6 illustrates an example network device of FIGS. 1-3.

FIG. 6 illustrates an exemplary network device 10A-E from the networks of FIGS. 1-3. The network device 10 includes a processor 100, a memory 101, and a communication interface 105. Additional, different, or fewer components may be provided. Different network devices may have the same or different arrangement of components. The network device 10 may be coupled with a database 107 and a workstation 109. The phrase "coupled with" is defined to mean directly connected to or indirectly connected through one or more intermediate components. Such intermediate components may include both hardware and software based components.

The network device 10 is part of a traffic engineered network including label switched paths (LSP). The network delivers specific quality of service levels for data streams or flows. Resource reservation protocol (RSVP) reserves resources across the network to achieve the specific quality of service levels. An upstream node, such as a point of remote repair, triggers reroute of traffic and signaling by generating or forwarding a reservation state message. The reservation state message includes a recorded label that defines the upstream merge point. The recorded label may be stored in a RRO of the reservation state message.

The communication interface 105 receives the resource reservation state message. The processor 100 is configured to identify a co-routed bypass tunnel from a tunnel sender address extracted from the at least one resource reservation state message. If the bypass tunnel exists, the processor 100 is configured to establish co-routed tunnels by directing traffic and signaling to the bypass tunnel. If no bypass tunnel exists, the processor 100 is configured to provision the bypass tunnel to establish co-routed tunnels. The reverse bypass tunnel can be inferred from the forward bypass tunnel path stored in the RRO of the at least one resource reservation state message.

The processor 100 may include a general processor, digital signal processor, an application specific integrated circuit (ASIC), field programmable gate array (FPGA), analog circuit, digital circuit, combinations thereof, or other now known or later developed processor. The processor 100 may be a single device or combinations of devices, such as associated with a network, distributed processing, or cloud computing.

The memory 101 may be a volatile memory or a non-volatile memory. The memory 101 may include one or more of a read only memory (ROM), random access memory (RAM), a flash memory, an electronic erasable program read only memory (EEPROM), or other type of memory. The memory 101 may be removable from the network device 10, such as a secure digital (SD) memory card.

The communication interface 105 may include any operable connection. An operable connection may be one in which signals, physical communications, and/or logical communications may be sent and/or received. An operable connection may include a physical interface, an electrical interface, and/or a data interface. The communication interface 105 provides for wireless and/or wired communications in any now known or later developed format.

Figure 7:
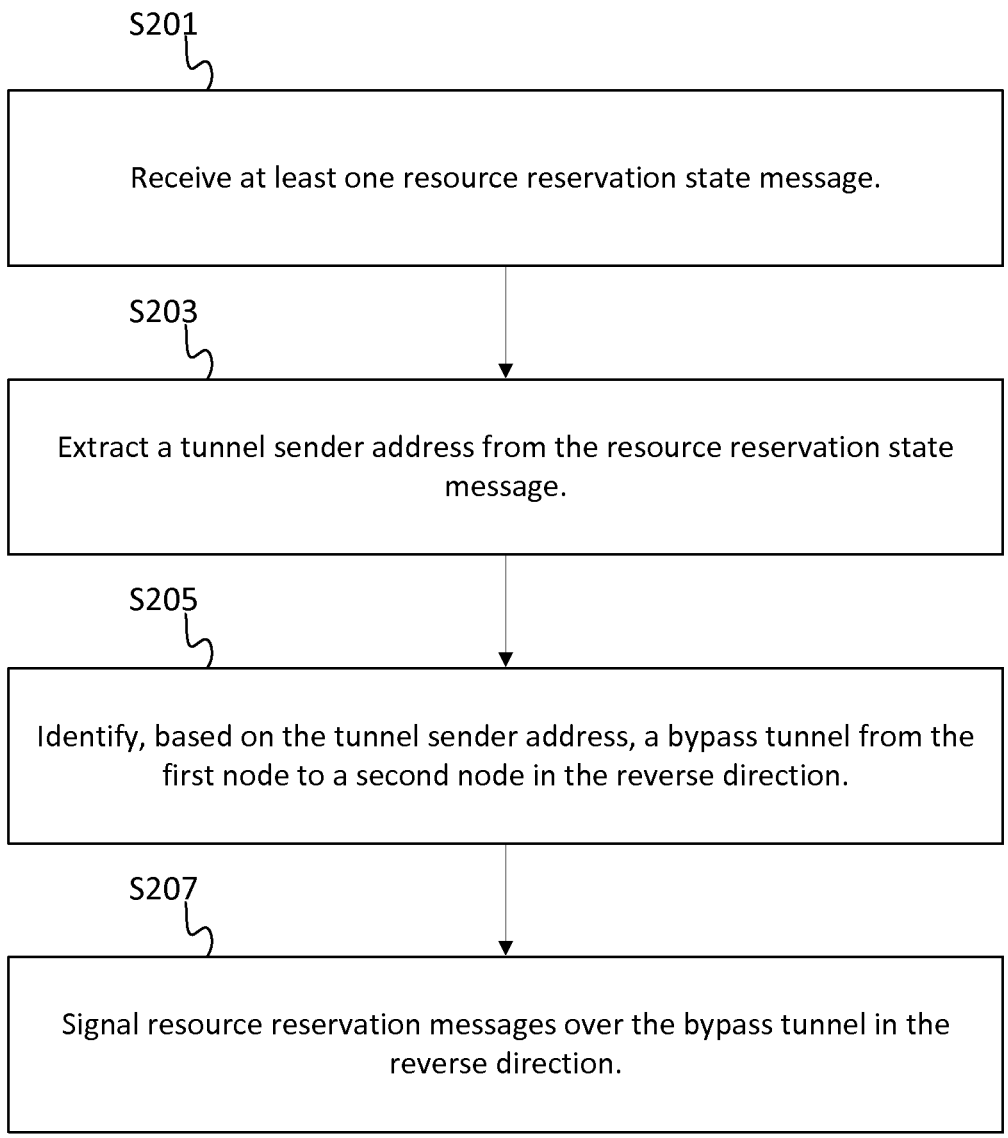
FIG. 7 illustrates an example flowchart for co-routed traffic engineering tunnels.

FIG. 7 illustrates an example flowchart for provisioning co-routed traffic engineering tunnels by the network device 10 of FIG. 6 acting as an upstream PLR. The acts are performed in the order shown or a different order. Additional, different, or fewer acts may be provided.

At act S201, the network device 10 receives a resource reservation state message. The upstream PLR examines the resource reservation state message to extract a tunnel sender address in act S203.

At act S205, the upstream PLR identifies a bypass tunnel based on the tunnel sender address. The bypass tunnel extends in the reverse direction from the upstream PLR to another node. At act S207, if the bypass tunnel exists in the reverse direction, the upstream PLR sends resource reservation messages over the bypass tunnel in the reverse direction.

Figure 8:
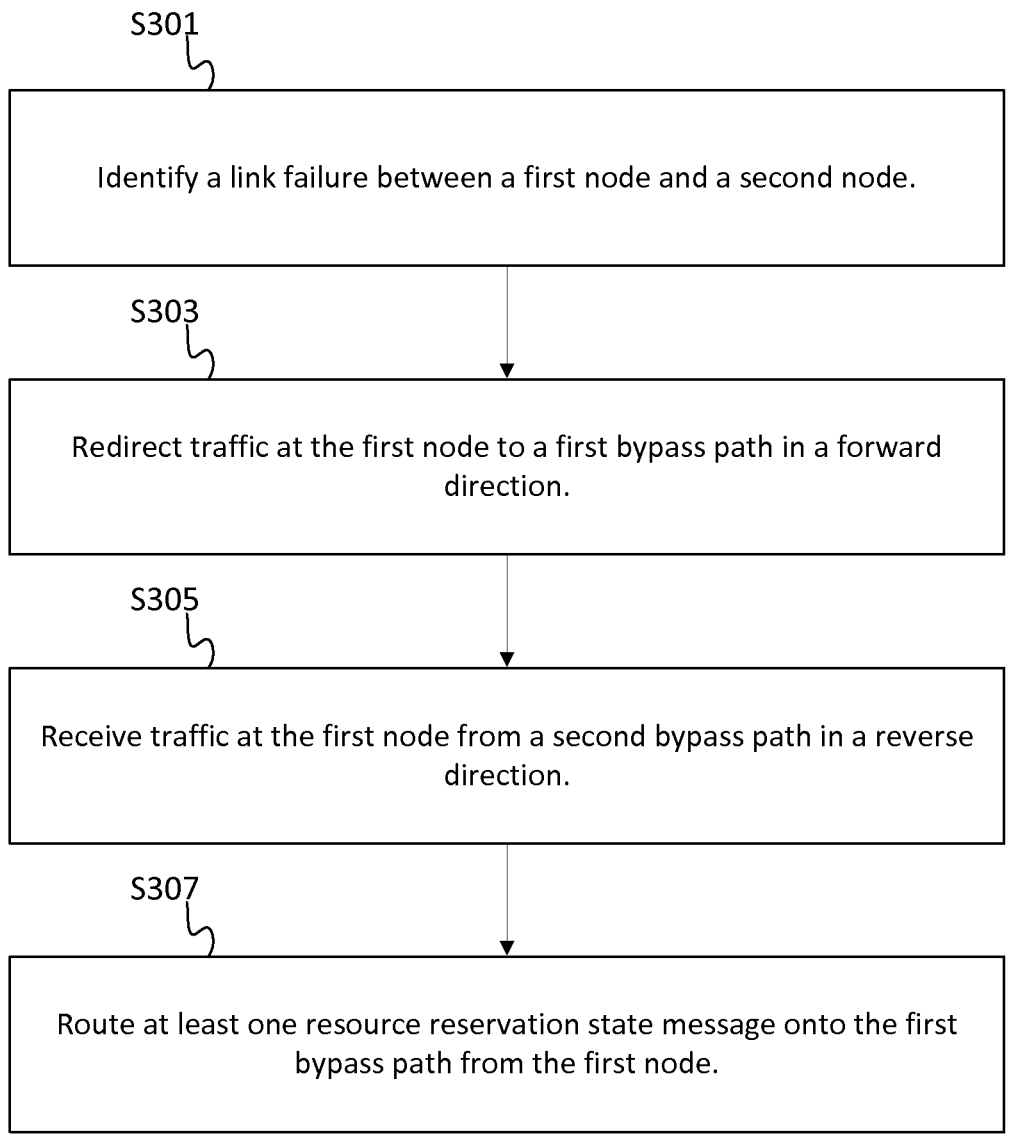
FIG. 8 illustrates another example flowchart for co-routed traffic engineering tunnels.

FIG. 8 illustrates another example flowchart for provisioning co-routed traffic engineering tunnels by the network device 10 of FIG. 6 acting as a downstream PLR. The acts are performed in the order shown or a different order. Additional, different or fewer acts may be provided.

At act S301, the downstream PLR identifies a link (or node) failure. The failure may be detected through heartbeat detection or error messaging. Heartbeat detection involves each node advertising that the node is working properly every predetermined time period (e.g., 50 ms). The absence of heartbeat messages indicates an error. Error messaging involves local detection of an error at a node or a link coupled with the node. The node generates an error message with data indicative of the failure.

At act S303, the downstream PLR redirects traffic to a bypass path in the forward direction. The traffic is directed using the procedures discussed above and described in RFC 4090.

Similarly, an upstream PLR redirects traffic to a second bypass path in the reverse direction. The second bypass path is co-routed and symmetric to the first bypass path. At act S305, the downstream PLR receives the traffic from the second bypass path from the upstream PLR. In response to receiving traffic from the second bypass path, the downstream PLR, routes at least one resource reservation state message on the first bypass path. Primary traffic is now protected bidirectionally by routing traffic over the two co-routed bypass tunnels.

The networks in FIGS. 1-3 may include wired networks, wireless networks, or combinations thereof. The wireless network may be a cellular telephone network, an 802.11, 802.16, 802.20, or WiMax network. Further, the networks may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving at least one resource reservation state message in a forward direction at a first node of a label switched path from a forward bypass tunnel in a forward direction;
   extracting, at the first node, a tunnel sender address of a downstream point of local repair from the at least one resource reservation state message, wherein the first node is upstream of the downstream point of local repair in the direction of the at least one resource reservation state message;
   identifying, based on the tunnel sender address, a reverse bypass tunnel from the first node to the downstream point of local repair in a reverse direction of the label switched path; and
   signaling resource reservation messages over the reverse bypass tunnel in the reverse direction to the downstream point of local repair;
   determining, when the reverse bypass tunnel has been provisioned, whether primary label switched path traffic has been routed over the reverse bypass tunnel; and
   when primary label switched path traffic has not been routed over the reverse bypass tunnel, directing traffic and signaling over the reverse bypass tunnel in the reverse direction.

2. The method of claim 1, further comprising:
   provisioning the reverse bypass tunnel from the first node to the downstream point of local repair.

3. The method of claim 2, further comprising:
   extracting at least one address from a path recorded in a record route object recorded in a forward direction; and
   incorporating the at least one address in an explicit route object for the reverse direction.

4. The method of claim 1, further comprising:
   determining whether provisioning the reverse bypass tunnel from the first node to the downstream point of local repair is possible; and
   generating a message to a head end node including data that indicates provisioning the reverse bypass tunnel is not possible, wherein the head end node is configured to tear down the label switch path based on the message.

5. The method of claim 1, wherein the at least one resource reservation state message received at the first node includes a plurality of resource reservation state messages received through multiple bypass tunnels resulting from multiple failures.

6. The method of claim 5, further comprising:
   identifying distances from a terminating end node of each of the bypass tunnels to the first node; and
   selecting the terminating end node that is farthest from the first node as the downstream point of local repair.

7. A method comprising:
   receiving at least one resource reservation state message in a forward direction at a first node of a label switched path from a first bypass path in a forward direction;
   extracting, at the first node, a tunnel sender address of a downstream point of local repair from the at least one resource reservation state message, wherein the first node is upstream of the downstream point of local repair in the direction of the at least one resource reservation state message;
   identifying, based on the tunnel sender address, a second bypass tunnel from the first node to the downstream point of local repair in a reverse direction of the label switched path;
   determining, when the second bypass tunnel has been provisioned, whether primary label switched path traffic has been routed over the second bypass tunnel;
   when primary label switched path traffic has been routed over the second bypass tunnel, signaling resource reservation messages over the second bypass tunnel in the reverse direction to the downstream point of local repair; and
   when primary label switched path traffic has not been routed over the second bypass tunnel, inferring the second bypass tunnel in the reverse direction from the first bypass tunnel in the forward direction and automatically provisioning the second bypass tunnel in the reverse direction.

8. A network device comprising:
a communication interface configured to receive at least one resource reservation state message at a first node in a forward direction across a forward bypass tunnel; and
a processor configured to provision a reverse bypass tunnel from the first node to a second node, which is downstream point of local repair, from a tunnel sender address of the downstream point of local repair extracted from the at least one resource reservation state message, and
wherein the processor is configured to determine when the reverse bypass tunnel has been provisioned, whether primary label switched path traffic has been routed over the reverse bypass tunnel,
wherein the network device is configured to direct resource reservation messages over the reverse bypass tunnel in the reverse direction to the downstream point of local repair when primary label switched path traffic has not been routed over the reverse bypass tunnel.

9. The network device of claim 8, wherein the processor is further configured to extract at least one address from a path recorded in a record route object recorded in a forward direction and incorporate the at least one address in an explicit route object for the reverse direction.

10. The network device of claim 8, wherein the processor is further configured to determine whether provisioning the reverse bypass tunnel from the first node to the second node is possible and generate a message to a head end node including data that indicates provisioning the reverse bypass tunnel is not possible, wherein the head end node is configured to tear down the label switch path based on the message.

11. The network device of claim 8, wherein the at least one resource reservation state message received at the first node includes a plurality of resource reservation state messages received through multiple bypass tunnels resulting from multiple failures.

12. The network device of claim 11, wherein the processor is configured to identify distances from a terminating end node of each of the bypass tunnels to the first node and select the terminating end node that is farthest from the first node as the second node.

13. The network device of claim 8, wherein a second bypass tunnel couples the first node and the second node in the forward direction.

14. The network device of claim 8, wherein the processor is configured to extract data from a record route object received in the forward direction as an explicit route object for the reverse direction.

15. The network device of claim 14, wherein the processor is configured to generate a plurality of messages each destined for other nodes, wherein the plurality of messages include the explicit route object.

16. A method comprising:
receiving a path message at a node from a forward direction in a label switched path across a forward bypass tunnel;
detecting a reservation protocol bypass object in the path message;
comparing a bypass destination address of the reservation protocol bypass object with an address of the node;
assigning a reverse bypass tunnel in a reverse direction for the label switched path when the bypass destination address is associated with the address of the node; and
forwarding the reservation protocol bypass object in the forward direction and removing the reservation protocol bypass object when the bypass destination address is not associated with the address of the node.

17. The method of claim 16, wherein the node is an upstream point of local repair.

18. The method of claim 16, wherein the reservation protocol bypass object is received from a downstream point of local repair.

\* \* \* \* \*